UNITED STATES PATENT OFFICE.

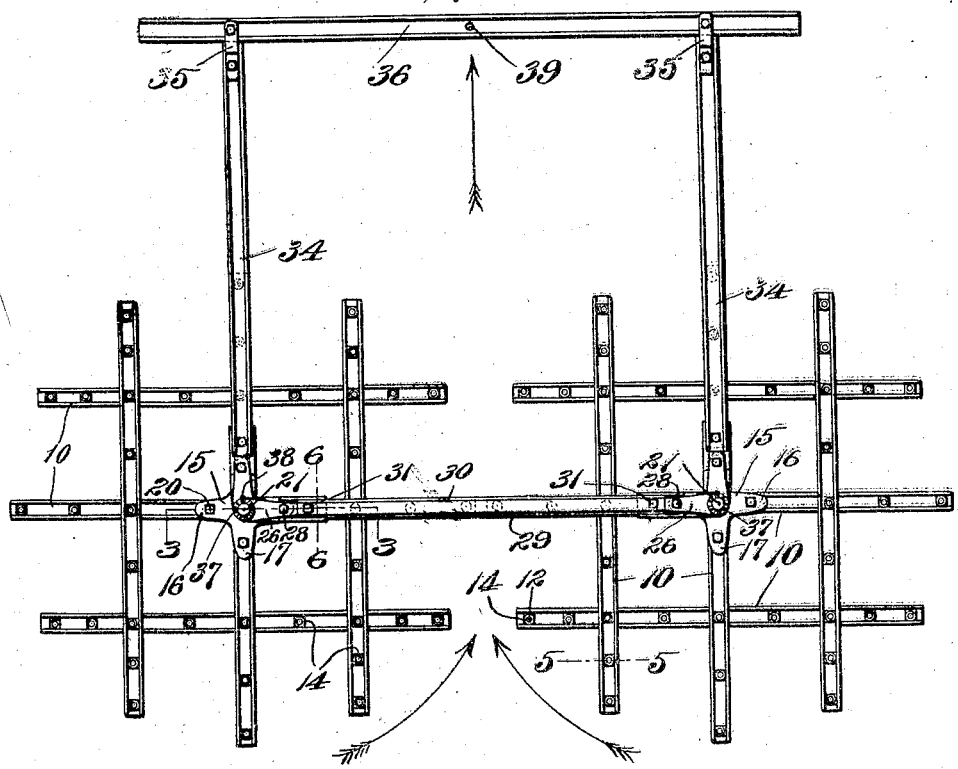
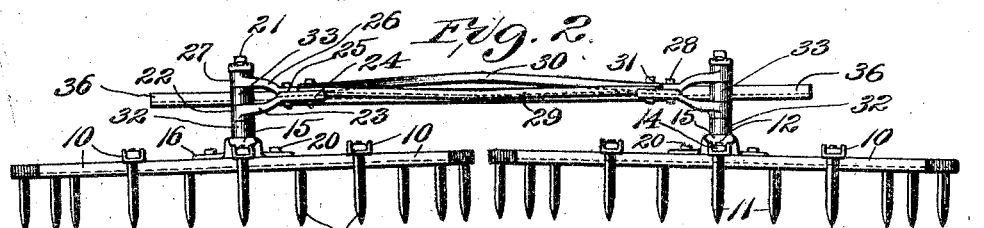
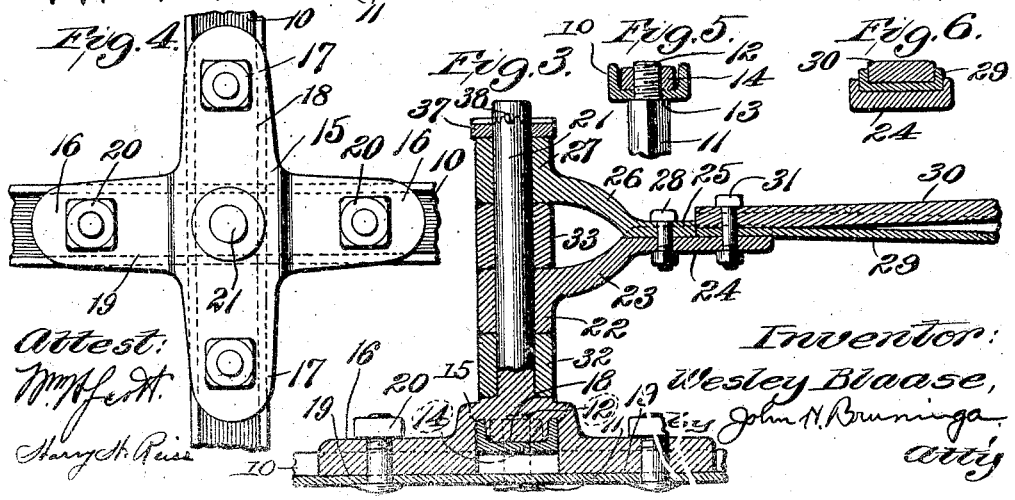

WESLEY BLAASE, OF ATWOOD, ILLINOIS.

ROTARY HARROW.

1,184,669.

Specification of Letters Patent. Patented May 23, 1916.

Application filed April 10, 1915. Serial No. 20,469.

*To all whom it may concern:*

Be it known that I, WESLEY BLAASE, a citizen of the United States, and residing at Atwood, county of Piatt, in the State of Illinois, have invented a certain new and useful Improvement in Rotary Harrows, of which the following is a specification.

This invention relates to harrows, and more particularly, to rotary harrows.

Some of the objects of this invention are to construct a rotary harrow which will efficiently cultivate the soil, which can be readily swung to turn corners, and which can be rotated in any desired direction.

Another object is to provide a rotary harrow having great strength and rigidity compared with the weight of its parts, which is simple in construction, and cheap to manufacture.

Further objects will appear from the detail description taken in connection with the accompanying drawing, in which:

Figure 1 is a plan of a harrow embodying this invention; Fig. 2 is a rear elevation; Fig. 3 is an enlarged section on the line 3—3, Fig. 1; Fig. 4 is a plan of the journal bracket shown in Fig. 3; Fig. 5 is a section on the line 5—5, Fig. 1; and, Fig. 6 is a section on the line 6—6, Fig. 1.

Referring to the accompanying drawing, it will be noted that the harrow comprises two rotatable frames, each consisting of channel bars 10 crossing one another. These channel bars are perforated to receive the harrow teeth 11, each of which is provided with a reduced threaded portion 12, extending through the channel and forming a shoulder 13 engaging the channel web. The reduced threaded portion is adapted to engage a nut 14 mounted between the channel flanges and retained in position thereby. The tooth is, therefore, inserted by simply screwing the same into the nut. Separate bolts may be provided for securing the channels together, but one of the harrow teeth may be utilized for this purpose.

At the center of each frame, and at the point of crossing of two of the bars 10, is mounted a journal bracket 15 having radial arms 16 and 17. The arms 17 are provided with ribs 18 fitting between the channels on one of the bars 10, and the arms 16 are provided with ribs 19 fitting between the channels on the crossing bar. The bracket is secured in position by bolts 20. Rising from the bracket is a journal pin 21, which is arranged at right angles to the bracket and, therefore, at right angles to the harrow frame.

Arranged to engage the pin is a journal 22 mounted on a bracket 23 having a channeled shank 24 adapted to receive the shank 25 of a bracket 26 having a journal 27 adapted to engage the pin. The shank 25 is secured in the channel of the shank 24 by a bolt 28. Mounted in the channel of the shank 24 is a channel beam 29 and a bar 30. These bars are secured, at their ends, in the channels of the shanks 24 by bolts 31. The bars 29 and 30 are bent outwardly, at their centers, so as to be separated at their centers to form a braced cross beam.

Mounted on the journal pin 21 are two journals 32 and 33 identical in construction to the journals 22 and 27 respectively, and connected in the same way, and in the channel of the journal shanks are bolted draft bars 34 which are connected by clevises to a draft beam 36 having a hole 39 in its center to receive the clevis. The journals of the cross beam and the journals of the draft bars are arranged in interlaced relation on the journal pins, and are retained in position by means of a grooved washer 37 and a cotter pin 38.

Upon reference to Fig. 2, it will be noted that the bearings formed in the journals 22 and 27 are so formed that the bearings on one end of the cross beam are arranged at an angle to the bearings on the other end of the cross beam, in fact, so that they flare outwardly in Fig. 2. This will throw the outside edges of the harrow frame down lower than the inside edges, as shown in Fig. 2, thereby causing the outside teeth to dig into the ground deeper than the inside teeth. If, therefore, the harrow is drawn in the direction of the arrow, Fig. 1, the outside edges of the harrow frame will be rotated so as to cause these frames to rotate in the direction of the arrows, Fig. 2. If, however, the cross beam is reversed, then the inside edges of the harrow frames will be lower than the outside edges, and the direction of rotation of the frames will be reversed. Since the draft bars 34 are pivoted to the journal pins, and since these draft bars are also pivoted to the draft beam, corners can be readily turned because of the link construction permitting the draft beams to swing laterally.

It will, therefore, be seen that the invention accomplishes its objects. A harrow is produced which will rotate in either direction so as to rotate either inwardly or outwardly at pleasure. The parts are so constructed that a rigid structure is produced. This is more particularly brought about by the rigid construction of the cross beam, and the interlaced construction of the journals and the cross beam. The harrow teeth can be readily cleaned and replaced.

It is obvious that various changes may be made in the details of construction without departing from the spirit of this invention. It is, therefore, to be understood that this invention is not to be limited to the specific construction shown and described.

Having thus described the invention what is claimed is:

1. A rotary harrow comprising a cross beam, a pair of harrow frames, a bracket mounted on each frame and having a pin, a journal on each end of said cross beam and adapted to reversibly engage said pin, said journals being arranged at an angle from the vertical and with respect to each other, and means for removably retaining said beam journals on said pins.

2. A rotary harrow comprising a cross beam, a pair of harrow frames each comprising channeled tooth carrying members, a bracket on each frame having ribs engaging the channels in said members, and a pin on each bracket adapted to engage said cross beam.

3. A rotary harrow comprising a cross beam, a pair of harrow frames, a bracket on each frame having a pin, and a journal bracket engaging each pin, said brackets being channeled to receive the ends of said beam.

4. A rotary harrow comprising a cross beam, a pair of harrow frames, a bracket on each frame having a pin, a journal bracket engaging said pin, and a second journal bracket engaging each pin, said first journal bracket being channeled to receive the said second journal bracket and the ends of said beam.

5. A rotary harrow comprising a pair of harrow frames, journal pins on said frames, journals on said pins, a cross bar comprising a pair of bars closer together at their ends than at their center, and a journal on each end of said bar adapted to engage said pins.

In testimony whereof I affix my signature in the presence of these two witnesses.

WESLEY BLAASE.

Witnesses:
W. T. HEINDSELMAN,
J. W. STEVEN.